US006225520B1

(12) United States Patent
Bauduin et al.

(10) Patent No.: US 6,225,520 B1
(45) Date of Patent: May 1, 2001

(54) HOT-MELT PRESSURE SENSITIVE ADHESIVE FOR ADHESIVE STRIPS

(75) Inventors: Francois Bauduin, Compiegne; Thierry Dreyfus, Margny-les-Compiegne; Jean-Marie Bordat, Bailly, all of (FR)

(73) Assignee: ATO Findley, S. A., Puteaux (FR)

( * ) Notice: Subject to any disclaimer, the term of this patent is extended or adjusted under 35 U.S.C. 154(b) by 0 days.

(21) Appl. No.: 09/043,674

(22) PCT Filed: Sep. 13, 1996

(86) PCT No.: PCT/FR96/01425

§ 371 Date: Jun. 9, 1998

§ 102(e) Date: Jun. 9, 1998

(87) PCT Pub. No.: WO97/12008

PCT Pub. Date: Apr. 3, 1997

(30) Foreign Application Priority Data

Sep. 26, 1995 (FR) .................................. 95 11253

(51) Int. Cl.$^7$ ...................................... A61F 13/00
(52) U.S. Cl. .............................................. 602/52
(58) Field of Search .................... 602/52, 48, 41–59; 128/888, 889

(56) References Cited

U.S. PATENT DOCUMENTS

| 4,247,428 | 1/1981 | Kulkarni . |
| 4,345,349 | * 8/1982 | Flanagan . |
| 4,358,557 | 11/1982 | Boggs . |
| 5,028,646 | * 7/1991 | Miller et al. . |
| 5,227,426 | * 7/1993 | Tse et al. . |
| 5,290,842 | 3/1994 | Sasaki et al. . |
| 5,362,792 | 11/1994 | Maayeh . |

FOREIGN PATENT DOCUMENTS

| 2 044 497 | 3/1972 | (DE) . |
| 0 104 005 | 3/1984 | (EP) . |
| WO 93/10734 | 6/1993 | (WO) . |
| WO 93/23488 | 11/1993 | (WO) . |
| WO 97/12008 | 4/1997 | (WO) . |

OTHER PUBLICATIONS

International Preliminary Examination Report dated Dec. 4, 1997.

* cited by examiner

Primary Examiner—Kim M. Lewis
(74) Attorney, Agent, or Firm—Smith, Gambrell & Russell, LLP

(57) ABSTRACT

The present invention relates to a pressure-sensitive hot-melt adhesive composition characterized in that it includes a) at least one ethylene-vinyl acetate, ethylene-methyl acrylate or ethylene-butyl acrylate copolymer
b) a solid tackifying resin
c) a liquid tackifying resin
d) an antioxidant
e) and optionally a diluent.

The invention also relates to the use of the pressure-sensitive hot-melt adhesive composition for the preparation of labels and adhesive tapes and more particularly of the tapes intended to come into contact with the skin.

13 Claims, No Drawings

HOT-MELT PRESSURE SENSITIVE ADHESIVE FOR ADHESIVE STRIPS

FIELD OF THE INVENTION

The invention relates to a pressure-sensitive hot-melt adhesive composition and to its use for the manufacture of labels and adhesive tapes and more particularly of tapes intended to come into contact with the skin.

BACKGROUND OF THE INVENTION

Adhesives in suspension or in solution in organic solvents are conventionally employed in the manufacture of adhesive tapes. When these adhesives are used it is necessary to carry out a stage of evaporation of the solvent, and this has the result of, on the one hand, limiting the production rate and, on the other hand, producing effluents of toxic character, the removal of which is found to be costly and tricky.

In order to avoid the use of solvents it has been proposed to employ pressure-sensitive hot-melt adhesives.

In WO 93/23488 an adhesive is proposed permitting the adhesive bonding of materials of low surface energy, for example a polyethylene film and a nonwoven fabric. This adhesive includes 75–98% of a diblock copolymer A-B, in which A consists predominantly of polystyrene or its derivatives and B is poly-1,3-butadiene, and a mixture consisting of a solid tackifying resin and of a liquid or oily tackifying resin In U.S. Pat. No. 5,290,842, a composition is described for the adhesive pasting of labels, which has good cohesion at ambient temperature. This composition includes a first elastomer, for example polybutadiene, and a second elastomer which has a glass transition temperature that is higher than that of the first elastomer, for example polyisoprene, and a tackifying agent which is miscible with the second elastomer.

Patent EP 0104005-A describes an adhesive composition for the adhesive bonding of female protections to garments. This composition includes a viscoelastic polymer of A-B-A type in which B denotes a polyolefin, for example an ethylene-butylene copolymer, and A denotes a polystyrene, and a tackifying resin.

Finally, in WO 93/10734, a positioning adhesive is proposed for female protections on silk, cotton and synthetic fibres. This adhesive includes 6–25% of a copolymer of formula $(A-B)_n-Y$, in which Y is a polyvalent coupling agent, A is a vinyl monomer substituted by an aromatic radical and B is polybutadiene, 30–70% of a compatible tackifying resin and 10–40% of a plasticizing oil.

The pressure-sensitive thermoplastic adhesives which have just been mentioned, while making it possible to avoid the use of solvent, are not, however, completely satisfactory. Thus, the adhesive tapes which are coated therewith exhibit, after being pulled off, a tendency to transfer the adhesive onto the support In addition, the adhesive tapes in contact with the skin exhibit poor resistance to perspiration.

DESCRIPTION OF THE INVENTION

The present invention proposes a new pressure-sensitive hot-melt adhesive composition exhibiting high cohesion and good resistance to moisture, this composition being characterized in that it includes a) at least one ethylene-vinyl acetate, ethylene-methyl acrylate or ethylene-butyl acrylate copolymer
b) a solid tackifying resin
c) a liquid tackifying resin
d) an antioxidant
e) and optionally a diluent.

The term "solid tackifying resin" here denotes tackifying resins exhibiting a ring-and-ball softening point higher than 60° C.

The term "liquid tackifying resin" here denotes a tackifying resin exhibiting a ring-and-ball softening point lower than 60° C.

Another subject of the present invention is the use of the said pressure-sensitive hot-melt adhesive composition for the manufacture of labels and adhesive tapes and more particularly of adhesive tapes intended to be adhesively bonded to the skin, such as, for example, bandages and dressings.

The copolymer according to the invention is generally chosen from copolymers exhibiting a vinyl acetate or methyl or butyl acrylate content of between 15 and 65% and preferably 30 and 50% by weight.

Copolymers exhibiting a melt index of between 1 and 1000 and preferably 2 and 500 are preferably employed.

Such copolymers can be obtained conventionally by high-pressure radical polymerization from ethylene and from vinyl acetate or methyl or butyl acrylate (see, for example, U.S. Pat. No. 5,298,582).

The solid tackifying resin according to the invention is generally chosen from natural or modified, for example dimerized, hydrogenated or polymerized, rosin esters, such as pentaerythritol, diethylene glycol and glycerol esters, polyterpene resins, for example "-pinene dipentene, copolymers of terpenes and of aromatic monomers such as styrene, vinyltoluene and "-methylstyrene, terpenephenolic resins, for example Dertophene T marketed by DRT, hydrocarbon resins of aliphatic and/or aromatic nature which are unhydrogenated or partially or completely hydrogenated, and mixtures of these compounds.

Hydrocarbon resins are preferably employed, and especially when the adhesive is intended to come into contact with the skin.

Such solid resins exhibiting a ring-and-ball softening point of between 60 and 140° C. and preferably 80 and 120° C. are advantageously employed.

The liquid tackifying resin acording to the invention is generally chosen from natural or modified, for example dimerized, hydrogenated or polymerized, rosin esters, for example glycerol and di- and triethylene glycol esters, polyterpene resins, for example "-pinene dipentene, copolymers of terpenes and of aromatic monomers such as styrene, vinyltoluene and"-methylstyrene, terpenephenolic resins, hydrocarbon resins of aliphatic and/or aromatic nature which are unhydrogenated or partially or completely hydrogenated and mixtures of these compounds.

Polyterpene resins and hydrocarbon resins are preferably employed, and especially when the adhesive is intended to come into contact with the skin.

Such liquid resins exhibiting a ring-and-ball softening point lower than 40° C. are preferably employed.

The antioxidant is generally chosen from the compounds of the sterically hindered phenol type, such as Irganox, marketed by Ciba Geigy, amines, phosphites and mixtures of these compounds.

The diluent according to the invention may be chosen from any type of diluent which is compatible with the copolymer employed. Polybutene, phthalates such as dioctyl phthalate (DOP), diisononyl phthalate (DINP) or diisodecyl phthalate (DIDP) and naphthenic or paraffinic oils are preferably employed.

The pressure-sensitive hot-melt adhesive composition according to the invention is obtained by fixing the various abovementioned constituents at a temperature which is generally between 120 and 150° C.

The pressure-sensitive hot-melt adhesive composition according to the invention generally includes from 30 to 50% by weight and preferably 30 to 40% of copolymer, from 10 to 40% and preferably 15 to 35% of solid tackifying agent, from 10 to 40% and preferably 15 to 35% of liquid tackifying resin, from 0.1 to 2% of antioxidant and from 0 to 20% of diluent.

When the composition is intended to be in contact with the skin the use of diluent is preferably avoided.

The pressure-sensitive hot-melt adhesive composition in accordance with the invention may be employed for the preparation of labels and adhesive tapes of any type. Purely by way of illustration it is possible to mention the coating, for example by means of a book nozzle, of substrates such as films based on polyethylene, polypropylene and polyvinyl chloride.

As a result of its properties of resistance to perspiration, the composition in accordance with the invention is particularly recommended for the preparation of adhesive tapes for cutaneous use such as adhesive dressings and strappings. In addition, such tapes exhibit a greater adhesiveness at the temperature of use close to 37° C. than at ambient temperature, and this allows easy repositioning of the tape on the skin in the event of incorrect application.

EXAMPLES

The examples which follow enable the invention to be illustrated.

In the examples the shear strength under stress (holding power) is measured according to PSTC standard 7.

The 180° peel is measured according to PSTC standard 1.

The T peel test is measured according to the method which consists in folding back onto itself the substrate coated with the adhesive to be tested, applying a moderate manual pressure to the said folded-back substrate and unbonding the portions thus adhesively bonded. The test is satisfactory when the substrate retains the appearance and adhesive properties of the substrate before bonding.

EXAMPLE 1

A pressure-sensitive hot-melt adhesive composition is produced by mixing the following compounds (in % by weight):

| | |
|---|---|
| EVA 4055 (ethylene-vinyl acetate copolymer; vinyl acetate: 40%; melt index: 55; Bayer) | 32.0 |
| Liquid petroleum resin (ECR 2520; Exxon) | 38.8 |
| Solid petroleum resin (ECR 368 LC; Exxon) | 29.0 |
| Antioxidant (IRGANOX 1010; Ciba Geigy) | 0.2 |

The composition thus obtained is applied onto a polyvinyl chloride film at a rate of 40 g/m$^2$ to form a dressing.

The coated substrate has a holding power equal to 50 mm and a 180° peel of 18 N/25 mm at 23° C. and 36 N/25 mm at 40° C.

The T peel test is satisfactory.

After application of the dressing to the skin it is found that the rupture on the skin is adhesive without transfer of adhesive onto the skin.

EXAMPLE 2

The conditions of Example 1 are followed in the presence of the following compounds (in % by weight):

| | |
|---|---|
| EVA 4055 (ethylene-vinyl acetate copolymer; vinyl acetate: 40%; melt index: 55; Bayer) | 30.0 |
| Liquid petroleum resin (ECR 2520; Exxon) | 36.8 |
| Solid petroleum resin (Escorez 5320; Exxon) | 33.0 |
| Antioxidant (Irganox 1010; Ciba Geigy) | 0.2 |

The coated substrate (dressing) exhibits a holding power equal to 80 mm and a 180° peel of 19 N/25 mm at 23° C.

The T peel test is satisfactory.

After application of the coated substrate onto the skin it is found that the rupture on the skin is adhesive without transfer of the adhesive onto the skin.

EXAMPLE 3

The conditions of Example 1 are followed in the presence of the following compounds (in a by weight):

| | |
|---|---|
| Lotryl 28MA175 (ethylene-methyl acrylate copolymer; methyl acrylate: 28%; melt index: 175; Elf Atochem S.A.) | 32.0 |
| Liquid petroleum resin (ECR 2520; Exxon) | 29.0 |
| Solid petroleum resin (ECR 385; Exxon) | 38.8 |
| Antioxidant (IRGANOX; Ciba Geigy) | 0.2 |

The coated substrate (dressing) exhibits a holding power of 7 mm and a 180° peel of 25 N/25 mm at 23° C.

The T peel test is satisfactory.

After application of the coated substrate onto the skin it is found that the rupture on the skin is adhesive, without transfer of adhesive onto the skin.

EXAMPLE 4

A self-adhesive hot-melt composition is prepared by mixing together the following compounds (in % by weight):

| | |
|---|---|
| Lotryl 28MA175 (ethylene/methyl acrylate copolymer; 28% methyl acrylate; melt index: 175; Elf Atochem S.A.) | 30.0 |
| Lotryl 35BA320 (ethylene/butyl acrylate copolymer; 35% butyl acrylate; melt index: 320; Elf Atochem S.A.) | 15.0 |
| Liquid petroleum resin (ECR 2520; Exxon) | 25.0 |
| Solid petroleum resin (ECR 6372; Exxon) | 29.8 |
| Antioxidant (Irganox 1010; Ciba-Geigy) | 0.2 |

The composition thus obtained has a Brookfield viscosity at 160° C. equal to 6000 mPa s and a ring-and-ball softening point equal to 66° C.

This composition is applied to a film of polyvinyl chloride at a rate of 40 g/m² to form a dressing.

The T peel test is correct.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

After applying the dressing to the skin, it is observed that the rupture on the skin is adhesive without transfer of adhesive onto the skin.

What is claimed is:

1. Pressure-sensitive hot-melt adhesive composition comprising:
    a) at least one ethylene-vinyl acetate, ethylene methyl acrylate or ethylene-butyl acrylate copolymer; said ethylene-vinyl acetate, ethylene methyl acrylate or ethylene-butyl acrylate content in the copolymer is between 30 and 50%,
    b) a solid tackifying resin having a ring-and-ball softening point of between 60 and 140° C.,
    c) a liquid tackifying resin having a ring-and-ball softening point lower than 40° C.,
    d) an antioxidant, and
    e) optionally a diluent.
    wherein said adhesive composition is from 30 to 50% by weight of copolymer, from 10 to 40% by weight of solid tackifying resin, from 10 to 40% by weight of liquid tackifying resin, from 0.1 to 2% by weight of antioxidant and from 0 to 20 % by weight of diluent.

2. Composition according to claim 1, wherein the copolymer has a melt index of between 1 and 1000.

3. Composition according to claim 1,
    wherein the solid tackifying resin is selected from rosin esters, pentaerythritol esters, polyterpene resins, copolymers of terpenes and of aromatic monomers, terpenephenolic resins, hydrocarbon resins of aliphatic and/or aromatic nature and mixtures of these compounds; and
    wherein the liquid tackifying resin is selected from rosin esters, glycerol, di- or triethylene glycol esters, polyterpene resins, copolymers of terpenes and of aromatic monomers. terpanephenolic resins hydrocarbon resins of aliphatic and/or aromatic nature and mixtures of these compounds.

4. Method for the preparation of labels and adhesive tapes comprising applying the composition according to claim 1 to the labels and adhesive tapes.

5. Method according to claim 4, wherein the tape is applied to skin.

6. Adhesive tape enclosing the composition according to claim 1.

7. Adhesive dressing enclosing the composition according to claim 1.

8. Adhesive strapping enclosing the composition according to claim 1.

9. Adhesive label enclosing the composition according to claim 1.

10. An adhesive tape for cutaneous use comprising a substrate and a pressure-sensitive hot-melt adhesive composition; said adhesive composition comprising:
    (a) from 30 to 50 % by weight of at least one ethylene-vinyl acetate, ethylene methyl acrylate or ethylene-butyl acrylate copolymer;
    (b) from 10 to 40% by weight of a solid tackifying resin selected from the group consisting of aliphatic hydrocarbon resin, aromatic hydrocarbon resins and mixtures thereof, said solid tackifying resin having a ring-and-ball softening point of between 60 and 140° C.;
    (c) from 10 to 40 % by weight of a liquid tackifying resin selected from the group consisting of polyterpene resin, aliphatic hydrocarbon resin, aromatic hydrocarbon resins and mixtures thereof, said liquid tackifying resin having a ring-and-ball softening point lower than 40° C.;
    (d) from 0.1 to 2% by weight of an antioxidant; and
    (e) 0% by weight of a diluent;
    wherein the tape has a greater adhesiveness at temperature of cutaneous use than at ambient temperature.

11. The adhesive tape according to claim 10 wherein the substrate comprises a dressing or a strapping to form an adhesive dressing or an adhesive strapping.

12. The adhesive tape according to claim 10 wherein the substrate comprises a film selected from the group consisting of polyethylene, polypropylene and polyvinyl chloride.

13. An adhesive tape for cutaneous use comprising a substrate and a pressure-sensitive hot-melt adhesive composition; said adhesive composition consisting essentially of:
    (a) from 30 to 50% by weight of at least one ethylene-vinyl acetate, ethylene methyl acrylate or ethylene-butyl acrylate copolymer;
    (b) from 10 to 40% by weight of a solid tackifying resin selected from the group consisting of aliphatic hydrocarbon resin, aromatic hydrocarbon resins and mixtures thereof, said solid tackifying resin having a ring-and-ball softening point of between 60 and 140° C.;
    (c) from 10 to 40% by weight of a liquid tackifying resin selected from the group consisting of polyterpene resin, aliphatic hydrocarbon resin, aromatic hydrocarbon resins and mixtures thereof, said liquid tackifying resin having a ring-and-ball softening point lower than 40° C.;
    (d) from 0.1 to 2% by weight of an antioxidant; and
    (e) 0% by weight of a diluent;
    wherein the tape has a greater adhesiveness at temperature of cutaneous use than at ambient temperature.

* * * * *